Figure 1:
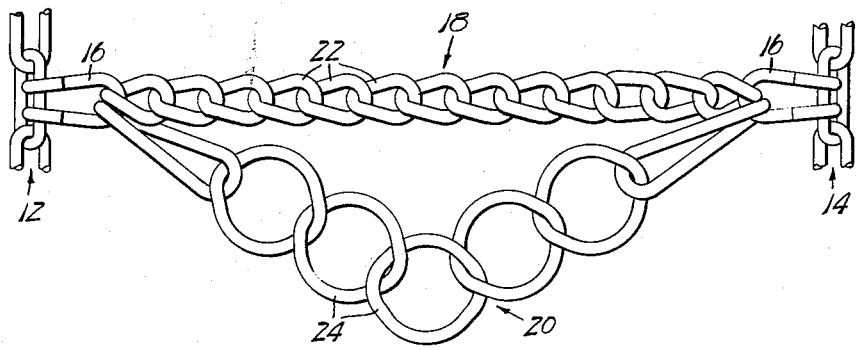

Jan. 19, 1954     S. L. RICHARDS ET AL     2,666,471

TRACTION CHAIN

Filed April 27, 1948

SHERMAN L. RICHARDS
& WILLIAM H. DEVONSHIRE
INVENTORS

BY
Bean, Brooks, Buckley & Bean.
ATTORNEYS

Patented Jan. 19, 1954

2,666,471

UNITED STATES PATENT OFFICE 2,666,471

TRACTION CHAIN

Sherman L. Richards, North Tonawanda, and William H. Devonshire, Kenmore, N. Y., assignors to Columbus McKinnon Chain Corporation, Tonawanda, N. Y.

Application April 27, 1948, Serial No. 23,412

6 Claims. (Cl. 152—239)

This invention relates to improvements in vehicle traction devices, and more particularly to an improved so-called "mud chain" for motor vehicles such as farm tractors, earth moving machines, military tractors, and the like.

One of the objects of the invention is to provide in a traction chain device an improved cross-link unit providing improved traction effects.

Another object of the invention is to provide a traction device for the purposes aforesaid which operates in improved manner for self-cleaning purposes.

Another object of the invention is to provide in a traction chain device an improved cross link unit which is automatically self-cleaning when operating in earth or mud or similar terrain.

Another object of the invention is to provide an improved traction chain device incorporating multiple strand cross chain units of improved form, whereby the traction device is adapted to be mounted and maintained in proper fitting relation upon a wheel tire, while at the same time providing the self-clearing operation of the cross chain units referred to hereinabove.

Another object of the invention is to obtain the features and advantages referred to hereinabove in a traction chain structure of improved simplicity.

Other objects and advantages of the invention will appear in the specification hereinafter.

It is well known in the traction chain art that when a vehicle is operating on soft earth or muddy terrain, such as in the case of military or farm tractors and the like; the cross chain links of the traction devices tend to become clogged with earth or mud with consequent reduction of their tractive efficiency. It is also known that in order to properly mount and maintain a traction chain device on a wheel tire the cross chain elements of the traction device must snugly interconnect the opposite side chains of the traction device running peripherally of the tire. It is only by means of cross chains lying snugly flatwise across the tire tread and tautly interconnecting the peripheral side chains that the traction device may be maintained in properly fitted position upon the tire. However, it is also known that single cross chain elements fitting snugly against a tire tread tend to become plugged with earth or mud which reduces the tractive efficiency thereof. Also, such snugly fitting flatwise disposed cross chain links provide at best only minimum "cleat" effect, because they cannot effectively roll and twist into edgewise attitudes relative to the tire tread, such as to obtain maximum "cleat" effects. On the other hand, if single cross chain elements are relatively loosely mounted upon a tire so as to be free to roll, they tend to cut into the tire tread and to seriously injure the latter.

Figure 2:
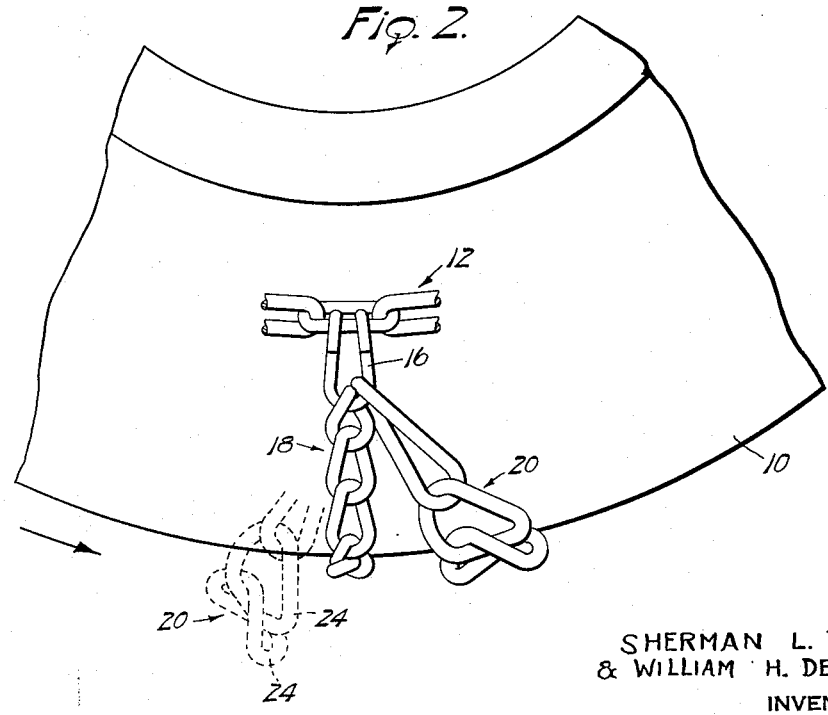

In the drawing:

Fig. 1 is a fragmentary plan view of a traction chain device including a cross chain unit of the invention; and Fig. 2 is a fragmentary side elevational view showing a vehicle tire mounting a chain device of the invention, with the novel cross chain unit thereof shown in different operative positions.

The invention is illustrated in the drawing in connection with a pneumatic tire 10 (Fig. 2), and the traction chain embodying the invention is illustrated to include the customary pair of side chains 12—14. The cross link units of the invention are illustrated in the drawing to extend transversely between the side chains at suitable intervals longitudinally thereof. As shown for example in the drawing, each cross chain unit comprises at the opposite ends thereof a hook 16 which engages oppositely positioned links of the side chains 12—14. Furthermore, each cross chain unit includes a relatively short tie link in the form of a cross chain 18 and a relatively long cross chain 20; the cross chains 18—20 being arranged in side-by-side relation and having their corresponding end links looped through the eye portions of the hooks 16—16.

The cross chain 18 is formed of relatively small twisted links 22, whereby to provide a relatively flat type chain which is longitudinally dimensioned so as to be pulled taut and to lie snugly in flatwise relation against the tread of the tire 10 when the opposite ends of the side chains 12—14 are hooked together to mount the traction device upon the tire. Thus, the cross chain elements 18 cooperate with the side chains 12—14 to enable the traction device to be mounted and maintained upon the tire in snug fitting relation. However, as explained hereinabove, the snug fitting cross chain elements 18 will tend to clog with mud whenever the vehicle is operated on muddy or soft dirt terrain, and in any case will provide relatively slight traction effects because of the flatwise disposition of the chain links 22 against the tire tread. Therefore, the present invention contemplates arrangement of the secondary cross chain element 20 in such manner as to provide greatly increased traction effects as well as automatic clearing of accumulated mud from the links of all of the cross chain elements. These effects are accomplished by providing the major portion of the chain element 20 to comprise relatively large and "wide-open" type links 24, and by dimensioning the chain element 20 so that it will be at all times slack enough to pass back and forth over the cross chain 18, as between the solid line and the broken line positions of the chain 20 shown in Fig. 2.

Thus it will be understood that as the vehicle wheel rotates, the slack chain 20 will alternately roll in opposite directions over the short cross chain 18 during each revolution of the wheel. This causes the slack chain links to relatively shift so as to free themselves of any accumulated mud, and at the same time to scavenge any accumulated mud away from the cross chain 18. Also, as is illustrated by Fig. 2, it will be seen that as the vehicle wheel is driven to rotate for example in the direction of the arrow, the slack cross chains of each unit will fall downwardly ahead of the corresponding short chains 18 in response to the forces of gravity during the downhill portion of travel of each cross chain unit, preliminary to successive tractional engagements thereof under the vehicle tire. Thus, as each cross chain unit first comes into terrain engaging position it will be in the condition illustrated by the solid lines in Fig. 2, with the slack chain 20 leading the taut chain 18. Hence, the more massive slack chain protects the smaller taut chain from excessive traction forces such as would tend to roll the taut chain, thereby avoiding cutting of the tire by the taut chain. Then as the tire continues to be driven in the direction of the arrow the resistance of the terrain to movement of the cross chain 20 will hold the latter while the taut chain 18 is driven ahead to pass between the slack chain 20 and the tire tread. This forces the slack chain to roll about its long axis, and therefore the links of the cross chain 20 are twisted into the radially extending attitudes thereof as illustrated by the broken line showing in Fig. 2. Thus, the links 24 of the chain 20 become disposed substantially edgewise relative to the tire tread, whereby to provide maximum "cleat" effect for increased traction purposes. Then, as explained hereinabove, after the wheel has rotated 180° from the position shown in Fig. 2, the slack cross chain 20 tends to roll over and to again fall into a position ahead of the taut chain 18 during the phase of wheel rotation preceding the next engagement of the same cross chain unit with the terrain under the tire.

Whereas in the drawing and the description hereinabove the taut cross element 18 is described to be in the form of a twisted link chain strand, it is contemplated that any other suitable device may be used in lieu thereof to function as cross tie links between the side chains 12—14. Also, the side elements may be formed of any other suitable material in lieu of the chain strands as illustrated. For example, suitable metal bands or cables or the like may be employed in lieu of the strands of chain as illustrated. In any case it will be appreciated that the relatively massive slack chain elements 20 will take the brunt of shocks resulting from impacts against rocks and the like, and will otherwise protect the taut cross link members from the brunt of wearing forces.

It will be appreciated that the traction devices of the invention may be applied to the vehicle wheels with no particular attention being paid to the direction of the dual cross chain connections into the terminal links 16. This is because in any case the slack chains will be loose enough that they may cross back and forth over the taut chains, to obtain the automatic cleaning and increased traction effects as explained hereinabove. Also, it will be appreciated that whenever the slack cross chain elements 20 become worn and/or break apart for any other reason, the traction device is nevertheless still operable because the taut cross link elements continue to hold the entire device in properly fitting relation upon the tire. Thus the traction device of the invention is operable until such time as both the slack and the taut cross chain elements are broken or worn through.

Thus, it will be appreciated that the novel cross chain unit of the invention is of simple construction such as may be easily and inexpensively manufactured in accord with the presently standard chain manufacturing processes, while at the same time being adapted to provide an improved traction effect in mud or dirt terrains, and an improved automatic self-cleaning action such as to maintain the traction efficiency of the device under all operative conditions.

What is claimed is:

1. A traction device for a vehicle wheel, said device comprising side chains and cross chain units extending between said side chains at intervals therealong, said cross chain units each comprising a taut cross chain and a slack cross chain disposed in side-by-side relation and each extending the entire distance between said side chains, said slack cross chains being of a greater lengthwise extent than said taut cross chains sufficient to enable the slack cross chain of each unit to roll freely back and forth across its associated taut cross chain as the wheel mounting the traction device rotates.

2. A traction device for a vehicle wheel, said device comprising side chains and cross chain units extending between said side chains at intervals therealong, said units each comprising a taut cross chain formed of small links and a slack cross chain formed of large links, said cross chains of each unit being disposed to substantially span the space between said side chains in side-by-side relation, said slack cross chains being of sufficient slackness to roll freely back and forth across said taut cross chains as the wheel mounting the traction device rotates.

3. A traction device for a vehicle wheel, said device comprising side members and cross chain units extending transversely between said side members at intervals therealong, said cross chain units each comprising a taut flexible cross chain extending between substantially opposed points on said side members and a slack cross chain loosely suspended between said points, said cross chains of each unit being disposed to substantially span the space between said side members in side-by-side relation, said slack cross chains being of sufficient slackness to be freely movable across their associated taut cross chains as the wheel mounting the device rotates.

4. A traction device for a vehicle wheel, said device comprising side members and cross chain units extending transversely between said side members at intervals therealong, said units each comprising a taut cross chain formed of small twisted links and a slack cross chain formed of large open links extending in side-by-side relation substantially the entire distance between substantially opposed points on said side members, said slack cross chains being of greater lengthwise extent than said taut cross chains sufficient to freely move back and forth across their associated taut cross chains as the wheel mounting the device rotates.

5. A traction cross chain unit for a vehicle tire comprising a pair of hooks adapted to be hooked into oppositely paired links of a pair of side chains, a short cross chain and a long cross chain disposed generally in side-by-side relation and disposed in contiguous relation at their opposite ends and connected thereat to said hooks, said long cross chain being sufficiently longer than said short cross chain to be freely movable to either side of said short cross chain when the latter is in taut condition.

6. A traction cross chain unit for a vehicle tire comprising, a pair of connection devices adapted to be connected to oppositely paired links of a pair of side chains and each defining an eye portion, a relatively short cross chain and a relatively long cross chain each fitted at its opposite ends to said eye portions to extend therebetween in substantially side-by-side relation, said short cross chain being formed of relatively small links and said long cross chain being formed of relatively large links, and said long cross chain being of sufficiently greater lengthwise extent than said short cross chain to roll freely back and forth across said short cross chain when the latter is in taut condition.

SHERMAN L. RICHARDS.
WILLIAM H. DEVONSHIRE.

References Cited in the file of this patent

UNITED STATES PATENTS

| Number | Name | Date |
|---|---|---|
| 968,751 | Edgerton | Aug. 30, 1910 |
| 1,503,191 | Kittelson | July 29, 1924 |
| 1,509,877 | Richie | Sept. 30, 1924 |
| 1,537,862 | Mohr et al. | May 12, 1925 |
| 2,451,761 | Miller et al. | Oct. 19, 1948 |
| 2,453,325 | Karstens | Nov. 9, 1948 |

FOREIGN PATENTS

| Number | Country | Date |
|---|---|---|
| 319,531 | Great Britain | Sept. 26, 1929 |
| 167,006 | Switzerland | Jan. 31, 1934 |